April 7, 1931.   H. KÜCHENMEISTER   1,799,378
METHOD OF AND SYSTEM FOR REPRODUCING SOUNDS
Filed Sept. 15, 1926   2 Sheets-Sheet 1
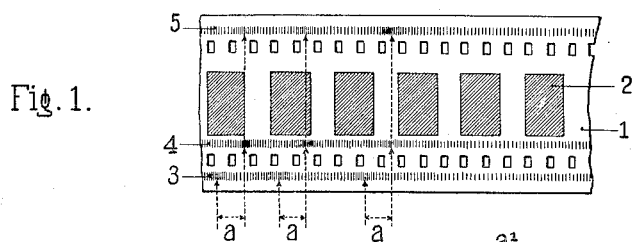
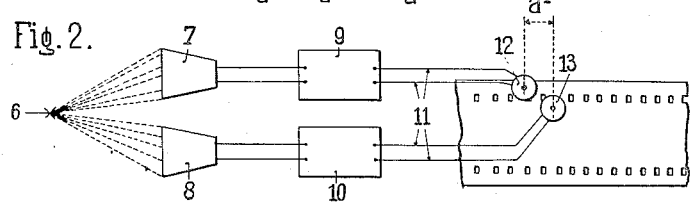
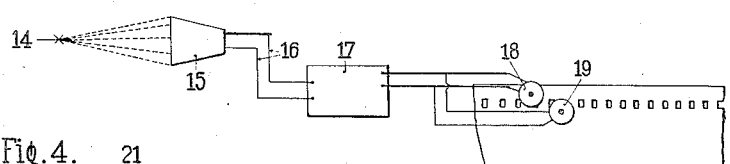
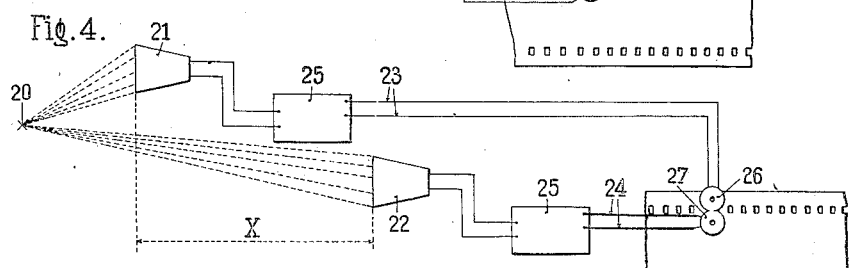
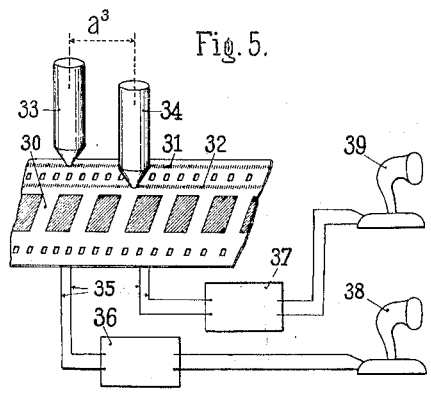
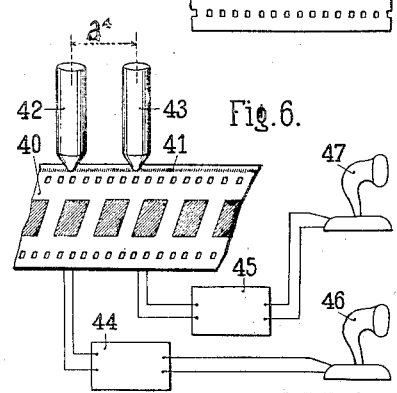
INVENTOR
Heinrich Küchenmeister
by
his Attorney.

April 7, 1931. H. KÜCHENMEISTER 1,799,378
METHOD OF AND SYSTEM FOR REPRODUCING SOUNDS
Filed Sept. 15, 1926 2 Sheets-Sheet 2

INVENTOR
Heinrich Küchenmeister
by
his Attorney.

Patented Apr. 7, 1931

1,799,378

UNITED STATES PATENT OFFICE

HEINRICH KÜCHENMEISTER, OF BERLIN, GERMANY

METHOD OF AND SYSTEM FOR REPRODUCING SOUNDS

Application filed September 15, 1926, Serial No. 135,650, and in Germany September 22, 1925.

My invention relates to improvements in the method of and system for reproducing sounds, the sound records used in the system, and the method of making the said records. More particularly my invention relates to the system in which a plurality of impulses are produced at slightly spaced points of the sound record. The object of the improvements is to provide a method and a system by means of which the sounds reproduced by elongated records can be improved in quality. More particularly my invention relates to the methods of reproducing sounds in which the sound waves are transformed into electrical waves acting on incandescent lamps, galvanometers provided with a mirror, and the like, which apparatus are adapted to emit light in dependence on the current impulses and to throw the same on a travelling film band for recording thereon signs representing the sound waves, the sounds being reproduced by means of a photo-cell, the electrical resistance of which is varied by means of oscillating light rays and which reproduces electrical currents actuating a suitable sound receiver. Further, the improved method may be used in connection with records in the form of steel wire magnetized so as to represent a sound record. In order to improve the quality of the sound reproduced by means of sound records of this type, I produce a plurality of sound waves of different phase.

Figure 7:
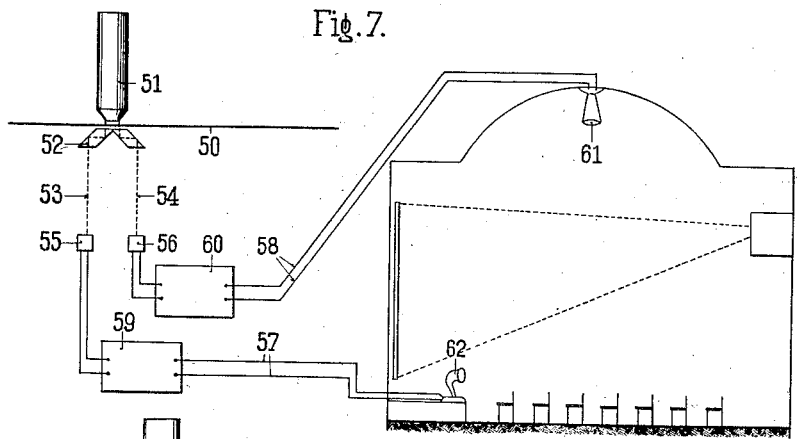
Figure 8:
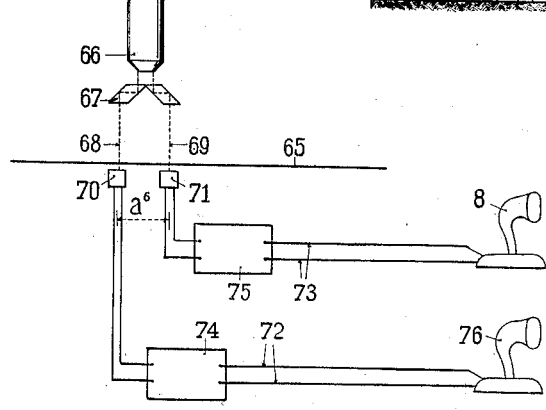
Figure 9:
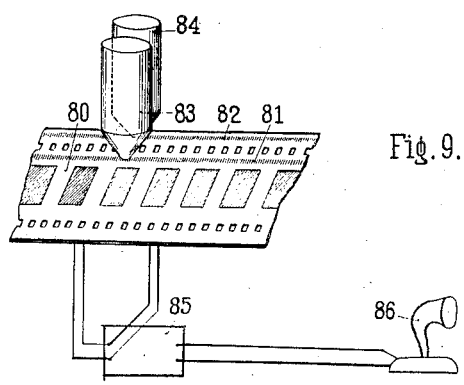

For the purpose of explaining the invention, several examples embodying the same have been shown in the accompanying drawings, in which the same letters of reference have been used in all the views to indicate corresponding parts. In said drawings:

Fig. 1 is a diagrammatic view showing a film band provided with an optical diapositive and a plurality of sound records displaced with relation to each other in longitudinal direction, Fig. 2 is a diagrammatic view showing the method of producing a plurality of sound records of different phase on a film band, Fig. 3 is a similar view showing a modification, Fig. 4 is a similar view showing another modification in which a plurality of microphones are located at different distances from the source of sounds, and in which sound records different in phase are produced on the film, Fig. 5 is a diagrammatic perspective view showing the manner of reproducing the sounds by means of a film band having similar records synchronously provided thereon, Fig. 6 is a similar perspective view showing the method of reproducing sounds by means of a single sound record and reproducing apparatuses acting on spaced parts of the record, Fig. 7 is a diagrammatic view showing the method of reproducing sounds by means of a single record and a single reproducing apparatus, the said reproducing apparatus being connected with loud speaking receivers disposed at different points of the film theatre, Fig. 8 is a diagrammatic view illustrating a method in which sound impulses are produced by means of a source of light acting on different points of a single record, and Fig. 9 shows a modification in which electrical waves of different phase are produced from a sound record and transformed into sounds by means of a single receiver.

In Fig. 1 I have shown a film 1 for kinematographic reproduction provided in the usual way with fields 2 containing the succession series of optical images. In addition, the film band is provided with a sound record 3 provided thereon by optical means in the manner to be described hereafter. In addition to the sound record 3 a sound record 4 or 5 is provided on the film band, and the said records 4 or 5 are displaced with relation to the record 3 longitudinally of the film band, as has been indicated by heavy and light shading of the sound records 3, 4 and 5, the phase difference $a$ of the said records being about 1/30 to 1/8 of a second.

In Fig. 2 I have illustrated one way of producing sound records of different phase on the film band. In the said figure the source of sounds 6 acts on two microphones 7 and 8 electrically connected with intensifiers 9 and 10. The said intensifiers are connected by leads 11 with apparatuses 12 and 13 for exposing the film, which apparatuses consist for example, of incandescent lamps, galvanometers carrying mirrors, or the like. By means of the said apparatuses the film is exposed according to the sound oscillations. As shown, the exposing apparatuses 12 and 13 are disposed with relation to each other longitudinally of the film, the distance $a^1$ between the said apparatuses corresponding to a phase difference of 1/30 to 1/8 of a second.

In Fig. 3 I have shown a modification of the apparatus for producing the sound records, in which the source of sounds 14 acts on a single microphone 15 connected by leads 16 including an intensifier 17 with two exposing apparatuses 18 and 19 displaced with relation to each other longitudinally of the film. Also in this case, similar sound records are produced on the film, which however differ in phase, in a similar way as shown in Fig. 2.

In the modification shown in Fig. 4 the source of sounds 20 acts on two microphones, or other sound transforming apparatuses, 21 and 22 located at different distances from the said source. For example, the distance between the source 20 and the microphone 21 is one meter, while the distance between the said source and the microphone 22 is 31 meters. The microphones 21 and 22 are connected by leads 23 and 24 including intensifiers 25 with two exposing apparatuses 26 and 27 disposed one beside the other. The sound waves reach the microphone 22 later than the microphone 21, so that the records produced on the film have a phase difference corresponding to the difference of the distances of the microphones 21 and 22 from the source of sounds. In the present example the phase difference is 1/11 of a second, according to the difference of the distances between the source of sounds 20 and the microphones 21 and 22.

In another modification of my method, sound records of different phase are produced on the film by making thereon two copies of the negative, one beside the other, the negative being slightly shifted longitudinally of the film when making the second copy.

In Figs. 5 to 9, I have illustrated the method of reproducing the series of sounds recorded on the film. In the embodiment shown in Fig. 5, a film 30 is used in which two sound records 31 and 32 are synchronously disposed one beside the other, and separate reproducing means are provided for each record. As shown each reproducing apparatus comprises a source of light rays 33, 34 adapted to direct the rays through the film records 31, 32 and onto a photo-cell (not shown), the electrical resistance of which is varied in dependence on the variation of the intensity of the light passing through the records. The said cells are connected by leads 35 including intensifiers 36, 37 with loud speakers 38 and 39. In order to reproduce the sounds of the records at the desired phase difference, the sources of light 33 and 34 and the photo-cells are displaced with relation to each other longitudinally of the film, as is indicated by $a3$.

In Fig. 6 I have shown a modification in which the film 40 is provided with a single sound record 41. For reproducing the sounds, two sources of light 42 and 43 and co-operating photo-cells (not shown) are provided each of which photo-cells is connected with intensifiers 44, 45 and loud speakers 46, 47. The sources of light 42, 43 and photo-cells are displayed with relation to each other longitudinally of the film, as is indicated by $a4$.

In Fig. 7 I have shown a modification in which the film 50 is likewise provided with a single sound record. For reproducing the sounds, a single source of light 51 is provided, the rays of which are divided by suitable means, such as a Nicol prism 52, into two branches 53, 54 each of which acts on a photo-cell 55, 56 connected by leads 57, 58 with intensifiers 59, 60 and loud speakers 61, 62. The latter are disposed within the theatre at different distances from the seats of the hearers. By the reproducing apparatus sounds of equal phase are produced by the loud speakers 61 and 62, but the latter being disposed at different distances from the hearers the sounds reach the ears of the hearers in immediate succession one after the other, so that the timbre is improved.

In Fig. 8 I have shown a modification in which a single record is provided on the film 65, and in which the rays emanating from a single source of light 66 are divided by a Nicol prism 67 into two branches 68 and 69 passing through the sound record at slightly spaced points thereof and acting on photo-cells 70 and 71. The photo-cells are connected by leads 72, 73 with intensifiers 74, 75 and loud speakers 76 and 78. In this modification, the phase difference is produced by causing the branches 68 and 69 of the pencil of light to pass through spaced portions of the sound record.

Finally, in the modification shown in Fig. 9 the film 80 is provided with two sound records 81 and 82 having different phases. The sources of light 83, 84 act on separate photo-cells (not shown) connected with a common intensifier 85 and the same loud speakers 86. In the operation of the system the sound impulses of different phases are superposed within the loud speaker 86. In lieu of the single loud speaker a group of loud speakers may be provided, whereby the intensity and colour of the sound are materially improved.

In the above description of the invention reference has been made to elongated sound records adapted to vary the light passing through the same. But I wish it to be understood that my invention is not limited to this feature, and that it generally relates to sound records provided on elongated carriers, such for example as carriers consisting of steel wires or bands magnetized according to the character of the sounds and reproducing the said sounds in the manner known in the art. By means of reproducing apparatus of this type, the intensity and colour of the sounds are improved in the same way as has been described above by reproducing the sounds at a suitable phase difference.

Practically a phase difference of from 1/30 to 1/10 of a second was found to give the best results. But I have found that even a smaller phase difference will cause an appreciable improvement of the colour of the sounds.

I claim:—

1. The method of improving the tone quality in talking films, which consists in producing in the film through optical means a plurality of phase-displaced sound record impressions, with a time interval of from 1/8 to 1/30 of a second and converting said impressions into sound.

2. The method of improving the tone quality in talking films, which consists in producing in the film a plurality of phase-displaced sound record impressions by a single recording means, comprising a plurality of devices for optically producing the impressions on the film, while acting at different places longitudinally of the film, with a time interval of from 1/8 to 1/30 of a second and converting said impressions into sound.

3. The method of improving the tone quality in talking films, which consists in producing in the film through optical means a plurality of phase-displaced sound record impressions, and converting said impressions into sound by means of a single sound reproducing device excited a plurality of times at a predetermined time interval.

In testimony whereof I hereunto affix my signature.

HEINRICH KÜCHENMEISTER.